United States Patent
Roy (10) Patent No.: US 9,240,000 B2
(45) Date of Patent: Jan. 19, 2016

(54) SOCIAL NETWORK FOR ENABLING THE PHYSICAL SHARING OF DOCUMENTS

(75) Inventor: Shourya Roy, Chenani (IN)

(73) Assignee: Xerox Corporation, Norwalk, CT (US)

( * ) Notice: Subject to any disclaimer, the term of this patent is extended or adjusted under 35 U.S.C. 154(b) by 55 days.

(21) Appl. No.: 13/042,217

(22) Filed: Mar. 7, 2011

(65) Prior Publication Data

US 2012/0233544 A1 Sep. 13, 2012

(51) Int. Cl.
*G06F 17/30* (2006.01)
*G06Q 10/10* (2012.01)

(52) U.S. Cl.
CPC .............. *G06Q 10/10* (2013.01); *G06F 17/30* (2013.01)

(58) Field of Classification Search
CPC ...................................................... G06F 17/30
USPC ......................................................... 715/274
See application file for complete search history.

(56) References Cited

U.S. PATENT DOCUMENTS

| | | | |
|---|---|---|---|
| 5,706,452 A | 1/1998 | Ivanov | |
| 6,860,422 B2 * | 3/2005 | Hull et al. | 235/376 |
| 7,333,224 B2 * | 2/2008 | Gallacher | 358/1.15 |
| 7,357,300 B2 | 4/2008 | Hull et al. | |
| 7,424,974 B2 | 9/2008 | Hull et al. | |
| 8,291,471 B2 * | 10/2012 | Piccinini et al. | 726/2 |
| 2002/0105666 A1 * | 8/2002 | Sesek | 358/1.14 |
| 2001/0214064 | 8/2010 | Shrader | |
| 2011/0307791 A1 * | 12/2011 | Pierre et al. | 715/736 |
| 2012/0105894 A1 * | 5/2012 | Freddi et al. | 358/1.14 |

* cited by examiner

*Primary Examiner* — Laurie Ries
*Assistant Examiner* — Tionna Burke
(74) *Attorney, Agent, or Firm* — Novel IP (57) ABSTRACT

The application discloses systems and methods for physically sharing a hard copy of a document. The systems and methods include presenting to a user a graphical user interface having printing options for printing the document, where the graphical user interface has an input for receiving an indication by the user that the user is willing to share the hard copy of the document; presenting to the user options for defining characteristics of the hard copy of the document in response to receiving the indication; and publishing at least one of the defined characteristics within a profile page of the user.

19 Claims, 3 Drawing Sheets

SOCIAL NETWORK FOR ENABLING THE PHYSICAL SHARING OF DOCUMENTS

FIELD

The present application discloses document management systems and methods. More particularly, the present application relates to a network-based portal that enables the efficient physical sharing of paper documents among workers in organizations.

BACKGROUND

Even though organizations strive to reduce the consumption of paper, a huge number of documents are printed everyday within the organizations. People have shown a propensity for reading and working on documents in paper form rather than on a computer screen. According to one estimate, an average office worker in the United States prints approximately 10,000 sheets per year, i.e. approximately 40 pages per working day. Hence, paper remains an important part of the work environment in most organizations, despite the array of options available for reviewing information in electronic form.

With increasing awareness regarding the environmental deterioration caused by the excessive consumption of paper, organizations are striving toward reducing paper consumption and waste, while not putting undue restrictions on documents printing and compromising worker efficiency.

According to one estimate, nearly half of the documents printed in an organization are for one time use only. This estimate applies to non-private documents, namely documents which are amenable to sharing between workers, as well. Examples of such non-private or sharable documents that are usually printed by more than one employee in an organization include emails sent to all employees regarding policies of the organization, quarterly project updates published on the Intranet of the organization, an informative article based on a topic of interest for all employees, policy memoranda, among other examples. Printed copies of these documents are short-lived and can easily be shared. Hence, systems and methods which enable the sharing of documents among people working in proximate locations, while still promoting worker efficiency and independence, is needed.

Presently, sharing and collaboration platforms are available for people who are in geographically different locations for sharing their ideas, reading preferences, and interests, among other topics. Even though such sharing and collaboration platforms have enabled improved communication between people throughout the world, there is still a need for an efficient social networking platform which is organization specific and which allows members of an organization to know what other members sitting in the same organizational space are reading, what documents they are amenable to sharing, and to which documents they are providing physical access.

Similarly, conventional electronic file sharing platforms, which enable the sharing of digital documents among people working at separate workstations, also fail to efficiently let people physically share their annotations, comments, highlights in non-editable document format like PDF, TIFF, or scanned copies of paper documents. For many individuals, paper documents remain more useful for detailed and thorough reading, highlighting, making notes, and sharing annotations with fellow knowledge workers. Hence, there is need for an improved collaborative platform for paper documents. There is also a need for a platform that enables members of an organization to share their paper documents, which would lead to a decrease in the number of documents printed in the organization and would minimize the wastage of paper.

SUMMARY

In one embodiment, the application discloses a method for physically sharing a hard copy of a document. The method is performed by a computing device and includes: 1) presenting to a user a graphical user interface comprising a plurality of printing options for printing the document, wherein said graphical user interface comprises an input for receiving an indication by the user that the user is willing to share the hard copy of the document; 2) presenting to the user at least one graphical user interface for defining a plurality of characteristics of said hard copy of the document, in response to receiving said indication; and 3) publishing at least one of said inputs within a profile page of the user, in response to receiving inputs defining said plurality of characteristics of the hard copy of the document from the user.

The method of sharing a hard copy of a document also comprises the step of publishing a list of hard copy of documents that the user is wiling to share within a predefined period of time on the profile page of the user; and prompting the user to publish a requirement for a printed document on the profile page of the user, which requirement is simultaneously published on the profile pages of one or more users belonging to a predefined network.

The method of sharing a hard copy of a document may optionally include presenting to the user, who is accessing a graphical user interface for printing a document, an automatic notification notifying the user if another user has, within a predefined time period, printed the same document. Such notification may be effectuated by 1) determining if the document has been printed earlier within a predefined time period, when a user executes a print command, the determination being made by accessing a print history of one or more printers installed in a predefined network and finding a match based on the document characteristics; 2) if a match is found, then displaying document information comprising a location of the user who had printed the document, the date and time when the document was printed, among other characteristics, multiple printing occurrences of the document being sorted based on predefined criteria before display; and 3) if a match is not found, then using one or more document handling processes to find at least one closest match to the document based on predefined criteria and displaying document information of the match.

In an embodiment, the profile page of the user is created by obtaining user identification information, user location information and one or more reading preference from the user. The profile page of the user provides access to the user to one or more social networking groups, and also provides recommendations to the user to connect to one or more users based on predefined criteria.

In another embodiment, the application discloses a system for physically sharing a hard copy of a document by presenting to a user a graphical user interface for printing the document, wherein said graphical user interface comprises an input for receiving an indication by the user that the user is willing to share the hard copy of the document; presenting to the user at least one graphical user interface for defining a plurality of characteristics of said hard copy of the document, in response to receiving said indication; and publishing at least one of said inputs within a profile page of the user.

In one embodiment, the system comprises a client module executing on a client computer for providing the graphical user interfaces to the user, and a server module comprising a data layer, a business layer and a presentation layer for presenting to the user accessing the graphical user interface for printing a document an automatic notification notifying the user if another user has, within a predefined time period, printed the same document. The server module may generate the automatic notification by: 1) determining if the document has been printed earlier within a predefined time period, when a user executes a print command, the determination being made by accessing a print history of one or more printers installed in a predefined network and finding a match based on the document characteristics; 2) if a match is found, then displaying document information comprising a location of the user who had printed the document, the date and time when the document was printed, among other characteristics, multiple printing occurrences of the document being sorted based on predefined criteria before display, and 3) if a match is not found, then using one or more document handling processes to find at least one closest match to the document based on predefined criteria, and displaying document information of the match.

In an embodiment, the data layer comprises: a print data access module for accessing a print memory database, the print data access module being in data communication with print logs of one or more printers installed in a predefined network; a graph data access module for accessing a social graph database comprising one or more social graphs depicting a plurality of users and their mutual relationship, each user being represented as a node in a social graph with an undirected link between two users if each of the two users belong to a network of the other; and a location data access module for accessing a location data database comprising location information corresponding to each user, the location data being used to provide to one or more users availability status of a printed document, at a location in proximity to the user.

In an embodiment, the print memory database comprises a print memory component for recording predefined information with respect to documents printed in the one or more printers installed in the predefined network; the recorded information comprising: a document name, an identification information of the user printing the document, a timestamp, and a location of the printer. The print data access module enables the function of presenting to the user, who is accessing the graphical user interface for printing a document, an automatic notification notifying the user if another user has, within a predefined time period, printed the same document.

In an embodiment, the business layer implements one or more business logic on data accessed by the data layer. The business layer comprises: a location analysis module for making recommendations to a user regarding availability of printed document, at a location in proximity to the user; a text analytics module for implementing document handling algorithms on the data for identifying documents relevant to the user; a social graph analysis module for identifying one or more predefined activities taking place in a network of each user by analyzing a social graph database comprising one or more social graphs depicting a plurality of users and their mutual relationship; and a recommendation engine for making recommendation to the user by implementing recommendation algorithms on the data accessed by the data layer.

In another embodiment, the presentation layer interacts with the underlying business layer and the client module for pushing output from the business layer for continuous display on the client module; the presentation layer comprises a user interface module, and a flash services module for interacting with the client module.

In another embodiment, the present specification discloses a method for physically sharing a hard copy of a document, said method being performed by a computing device having a processor and a memory storing a plurality of programmatic instructions, wherein, when said processor executes said plurality of programmatic instructions, said computing device 1) presents a first graphical user interface to a user, wherein said first graphical user interface comprises a plurality of printing options for printing the document, wherein said first graphical user interface comprises an input for receiving an indication by the user that the user is willing to physically share the hard copy of the document; 2) presents to said user a plurality of options in response to receiving said indication, wherein selection of said options defines a plurality of characteristics of said hard copy of the document; and 3) transmits at least one of said characteristics of said hard copy to a server, wherein said server hosts at least a portion of a social network comprising a profile page of the user and wherein at least one of said characteristics of said hard copy is published on said profile page.

Optionally, the options are presented in at least one of said first graphical user interface, a pop up window, a dialog box, or a second graphical user interface. The profile page further comprises a list of hard copy of documents that the user is wiling to share within a predefined period of time. The server prompts the user to define at least one requirement for a hard copy of a document, wherein said requirement is subsequently published on the profile page of the user and published on a profile page of at least one other user belonging to the social network. The computing device presents to the user a notification notifying the user if another user has, within a predefined time period, printed the hard copy of the document. The notification is generated automatically by comparing an attribute of the hard copy of the document to data indicative of documents which have been previously printed. The attribute is at least one of the plurality of characteristics.

The notification is generated automatically by accessing a print history of one or more printers installed in a predefined network and finding a match based on document characteristics. If a match is found, document information comprising a location of the user who had printed the document and a time when the document was printed is displayed. If a match is not found, a closest match to the document is found based on predefined criteria. The profile page of the user provides recommendations to the user to connect to one or more users based on predefined criteria.

In another embodiment, the system for physically sharing a hard copy of a document, comprises a plurality of programmatic instructions stored on a medium, wherein, when said plurality of programmatic instructions are executed, cause a computing device to present a first graphical user interface to a user, wherein said first graphical user interface comprises a plurality of printing options for printing the document, wherein said first graphical user interface comprises an input for receiving an indication by the user that the user is willing to physically share the hard copy of the document and a server for hosting at least a portion of a social network comprising a profile page of the user, wherein said server receives at least one of characteristic of the hard copy of the document, in response to the user indicating a willingness to physically share the hard copy and publishes said characteristic on the profile page of the user.

The plurality of programmatic instructions further cause a computing device to present to said user a plurality of options in response to receiving said indication, wherein selection of said options defines a plurality of characteristics of said hard copy of the document. The characteristic is at least one of title, author, date, location of document, location of printing, location of a user. The options are presented in at least one of said first graphical user interface, a pop up window, a dialog box, or a second graphical user interface. The profile page further comprises a list of hard copy of documents that the user is wiling to share within a predefined period of time. The server prompts the user to define at least one requirement for a hard copy of a document, wherein said requirement is subsequently published on the profile page of the user and published on a profile page of at least one other user belonging to the social network. The plurality of programmatic instructions further cause a computing device to present to the user a notification notifying the user if another user has, within a predefined time period, printed the hard copy of the document. The notification is generated automatically by comparing an attribute of the hard copy of the document to data indicative of documents which have been previously printed. The notification is generated automatically by accessing a print history of one or more printers installed in a predefined network and finding a match based on document characteristics. If a match is found, document information comprising a location of the user who had printed the document and a time when the document was printed is displayed. If a match is not found, a closest match to the document is found based on predefined criteria.

The aforementioned and other embodiments of the present shall be described in greater depth in the drawings and detailed description provided below.

BRIEF DESCRIPTION OF THE DRAWINGS

These and other features and advantages will be appreciated as they become better understood by reference to the following Detailed Description when considered in connection with the accompanying drawings, wherein.

DETAILED DESCRIPTION

The present application discloses multiple embodiments. The following disclosure is provided in order to enable a person having ordinary skill in the art to practice the claimed inventions. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present application is to be accorded the widest scope encompassing numerous alternatives, modifications and equivalents consistent with the principles and features disclosed. For purpose of clarity, details relating to technical material that is known in the technical fields related to the claimed inventions have not been described in detail so as not to unnecessarily obscure the disclosure.

The present application discloses a network-based portal that enables sharing of paper documents among knowledge workers in organizations. For purposes of this application, the term "portal" shall mean an electronic graphical user interface, accessible via a display in data communication with a computing device, which provides a user with access to certain of the physical paper sharing methods, processes, features or functionality disclosed herein. For purposes of this application, the term "profile page" shall refer to data that is intended to be processed and displayed by a computing device and that is specific to an individual user and modifiable by that individual user. For purposes of this application, the term "social network" comprises a plurality of profile pages, at least some of which are in data communication with each other and serve to place individuals associated with the profile pages in communication with each other in accordance with one or more predefined rules.

For purposes of this application, the term "organization" shall mean any group of people who wish to selectively share physical documents within the members of that group. For purposes of this application, the term "user-controllable feature" shall mean a software feature that may be activated, controlled, or otherwise used by a person interacting with the portal. For purposes of this application, the term "shared document" or "shareable document" shall mean a physical document which is designated, via the portal, as being available for physical transfer from the possession of one user to the possession of another user or which has been physically transferred from the possession of one user to the possession of another user. For purposes of this application, a "hard copy of a document" is any human readable data, including text, graphics, alphanumeric strings, or other representations, printed on any form of paper.

The portal provides users with a plurality of user-controllable features such as print publishing, requirement publishing, automatic notification, discussion forums, and the ability to define interest, skill, or other topic-based communities. The print publishing feature enables a user to publish a list of shareable documents that they have printed and are willing to share by, within, or during a specific time period. This feature enables users to efficiently communicate their willingness to share one-time-prints with co-workers, eliminating repeat-prints and bringing down the overall consumption of paper. In various embodiments, the actual exchange/handover of printed shareable documents takes place physically between two users, after one user communicates to the other user the physical location of the desired shareable document.

The requirement publishing feature allows users to publish a requirement for a printed shareable document on the web portal. For example, before printing a shareable document, a user can actively publish a need for that document via the portal and, therefore, prompt other users for the shareable document before printing the document.

The automatic notification feature is used to notify a user if another user has, within a predefined time period, printed the same shareable document that is required by, or is about to be printed by, a user. In one embodiment, the automatic notification feature displays a list of people who have printed the shareable document of interest in descending order of age (i.e. when the shareable document was printed), or physical location (i.e. physical location of the shareable document), or whether the one or more people who have printed the document are part of the same network.

The discussion forums enabled by the present invention provide a discussion platform for users reading the same shared document(s), e.g. research paper(s). The portal also provides for the formation of user communities based on a plurality of variables, such as geographic proximity, interests, skill set, position within an organization, being assigned to the same workgroup, among other variables.

To encourage an organization's group members to sign up for the portal, the portal prompts users for identification information, location information and document reading preferences and thereafter generates a profile page, which may be accessed via one or more graphical user interfaces (GUIs). In one embodiment, the user may perform actions, such as print publishing, requirement publishing, automatic notification, discussion forums, and participating in communities, via the profile page.

It should be appreciated that the software-based user-controllable features described herein are accessed by a user by the user operating a computing device with a processor executing a plurality of programmatic instructions stored in a memory to receive data, transmit data, and display a graphical user interface representative of the portal. The user computing device is in data communication, either via a wired or wireless connection, to a network that comprises a computing device with a processor executing a plurality of programmatic instructions stored in a memory to enable the portal and associated user-controllable features. As used herein, the "computing device" is any device capable of accessing or displaying electronic data, including personal computers, laptops, desktops, mobile phones, tablet PCs, or other computers.

Figure 1:
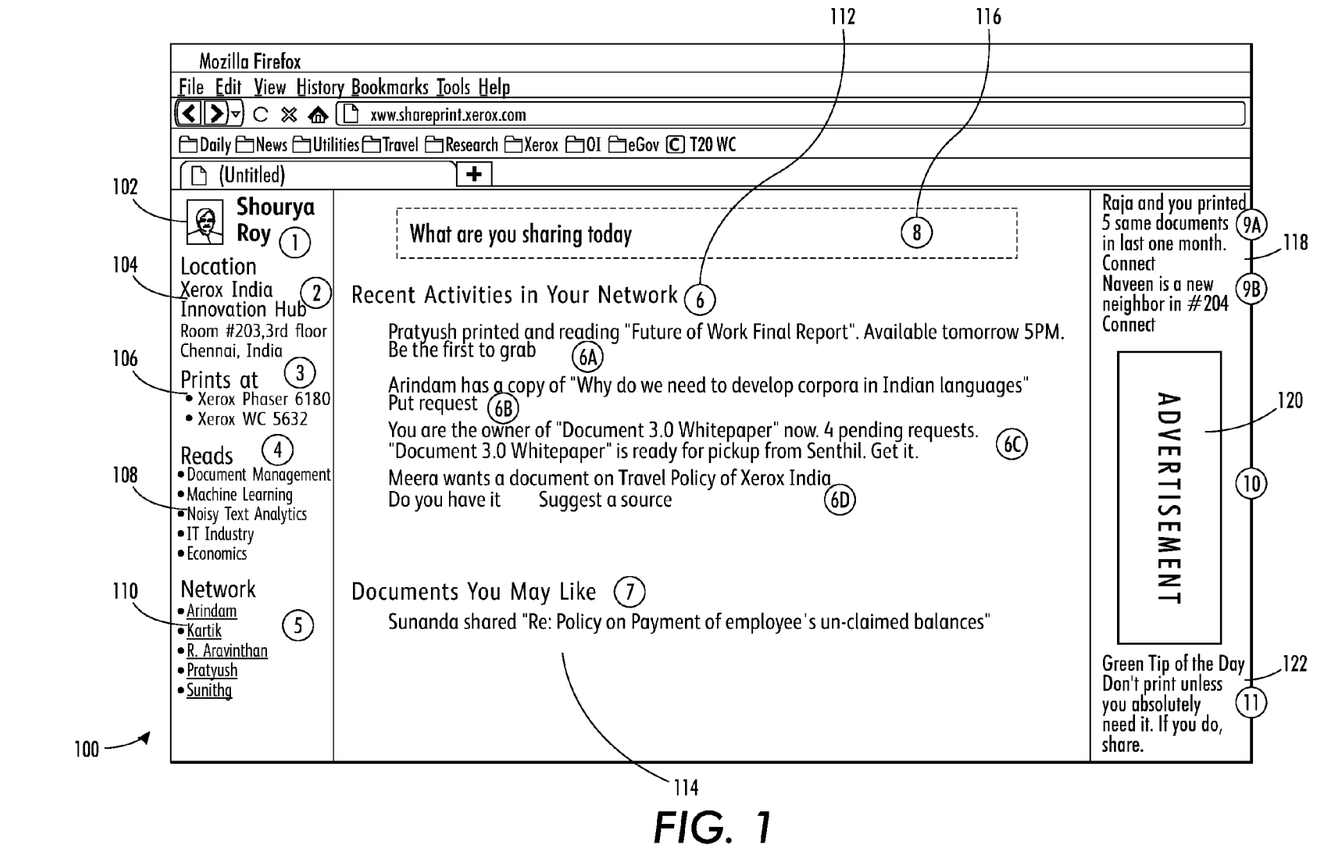
FIG. 1 illustrates an exemplary screenshot of a graphical user interface for accessing one embodiment of a document sharing portal.

FIG. 1 illustrates an exemplary user interface for accessing the portal, in accordance with an embodiment of the present invention. Screenshot 100 comprises sections 102, 104, 106, 108, 110, 112, 114, 116, 118, 120, and 122. The information displayed is obtained from an underlying server module which is described with reference to FIG. 3.

Section 102 provides information regarding a user who has logged into the portal. In one embodiment, section 102 provides information such as a profile name of the user and/or a picture. Other information that the user has provided at the time of signing up for the portal may also be visible in section 102. Section 104 displays a location of the user along with the user's physical location within the organization. In various embodiments, location information such as a name of premises in which the user is located, a room number, a desk number, telephone number, extension number, fax number, email address, alternative social network identifiers, or other identifiers are displayed. The accuracy of the physical contact information displayed in section 104 is important to enable the efficient exchange or handover of shareable documents. The accurate location information of a user in possession of a shareable document must be displayed on the portal in order to enable other users to reach the location and obtain the document.

Section 106 displays the names of the one or more networked printers, if any, to which at least one of the user's computing devices is configured to output print jobs. In various embodiments, this information can be used by users to coordinate physical document transfer, such as designating areas near common networked printers at which to leave shareable documents.

Section 108 provides information regarding areas or topics of interest to the user. The portal provides a social networking platform for communicating areas of reading interest, as well as enabling the sharing of printed documents. Hence, section 108 provides user preference information that enables the formation of communities and groups. Other users having similar reading preferences or who are interested in the user's reading area may contact the user by using the location information displayed in section 104. In an embodiment, a user may network with one or more users by using the portal. The user may network with other users whose reading preferences or areas of interests overlap. Section 110 displays the names of individuals within the organization known to the user, either through a common forum, common community, common work group, prior physical exchanges, or one-to-one linking between the users. Such individuals are referred to as a "user network".

Section 112 displays a list of activities taking place within one or amongst the individuals within the organization who are known to the user. In one embodiment, exemplary user network activities comprise messages posted by members of the user network putting in a request for or stating the availability of a shareable document. The portal interface allows users to respond to the posted messages by following a link. For example, a message stating that a member of the user network has printed a shareable document and will make it available for others who are interested by the next day may be displayed, along with providing an option to the user to respond by putting in a request for the shareable document. Other exemplary messages comprise information that a user has a shared document, such as an old document or a document which the user had, for example, photocopied from a journal. Section 112 also displays information such as the number of pending requests for a document possessed by a user. Where a member of the user network has put in a request for a shareable document in possession of another user, a message can be sent to the member by the user or by other members of the user network specifying the location of the document.

Section 114 provides information regarding various activities happening outside the user network but which could potentially be of interest to the user. Section 116 enables users to publish the availability of one or more shareable documents in their possession. In one embodiment, section 116 comprises a textbox in which the user can type in titles of one or more documents available and ready to be shared. The information typed in the text box is published on profile pages (user interfaces) of all members of the user's network. In one embodiment, the entered information may be made available to all users who have signed up to the portal.

Section 118 provides recommendations to a user to connect with one or more individuals based on predefined criteria. For example, section 118 may provide a suggestion to connect with people because they are printing or reading similar documents or they are within a predefined geographical location. A user specific advertisement may be displayed in section 120. Section 122 displays awareness messages, helpful tips, policy announcements, or other additional communications to increase awareness among people towards sharing printed or being environmentally conscious.

In various embodiments of the present invention, a user may share printed documents by providing information regarding availability of the document to other user by inputting that information into the portal directly or through a print user interface that is integrated into the portal system. The user can directly publish the availability information with respect to a printed document by publishing the information on the profile page (via section 112 of FIG. 1). In that embodiment, a user inputs, via his computing device, the name, location, and other relevant information regarding the shareable document into the portal, which then displays that information throughout the user network.

The portal also provides a mechanism for efficiently designating a document as being shareable by integrating the portal with a printer user interface, thereby providing users with the ability to designate shareable documents, or be informed of the existence of shareable documents, at the critically important moment when a user is in the process of printing a document.

In one embodiment, the portal provides a mechanism for sharing printed documents by providing a checkbox on a printer user interface. If a user does not uncheck the checkbox before giving a print command, the system presumes the document to be printed is a shareable document and, accordingly, generates a second window or display on the user's screen. Within that second display are various options for defining properties of the shareable document, such as the title of the document, author of the document, when the document will be available for sharing, geographical location of the document where it will be available for sharing, and when the document will no longer be available for sharing. Once the user has defined the properties of the shareable document, the information is communicated from the printer interface to the portal system and then published on the profile pages of a plurality of users via the portal.

Figure 2:
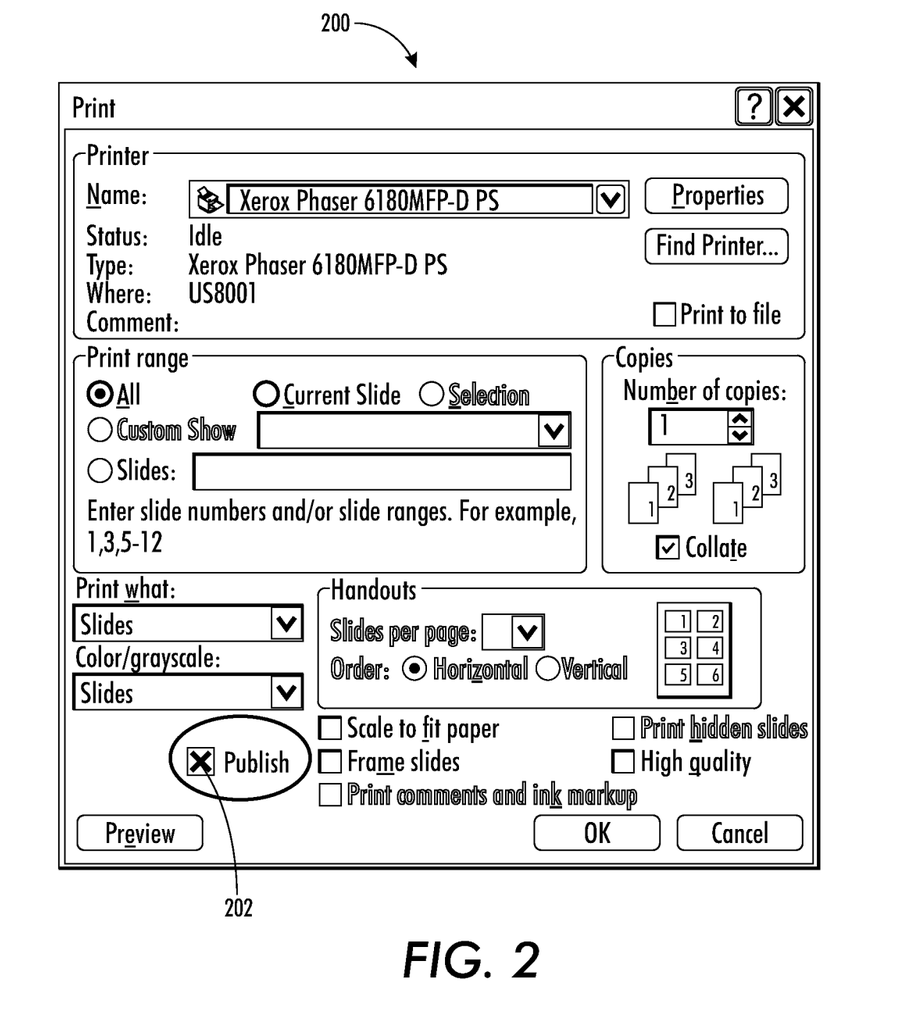
FIG. 2 illustrates a screenshot of an exemplary print configuration page that is preferably displayed when a user chooses to print a document.

FIG. 2 illustrates a screenshot of an exemplary print configuration interface 200 that is displayed when a user chooses to print a document. The print configuration interface 200 comprises a plurality of input boxes for entering standard printing parameters commonly known in the art such as printer characteristics, paper characteristics, number of copies required, print format selection, among other variables. The standard printing functions are well known in the art and are not described herein.

Apart from standard inputs, the interface 200 comprises a checkbox 202 titled "Publish". In one embodiment, the checkbox 202 is titled "Share". If a user does not uncheck the checkbox 202 before finally authorizing a print command (i.e. clicking on the "OK" icon), a secondary interface is shown that requests information from the user regarding the title of the document being printed, the geographic location of the document, the time period when the document will be available for sharing, and other prompts for characteristics of the shareable document. These shareable document characteristics are then communicated, along with the identity of the printing user, to a server hosting at least a portion of the portal, stored in a database, and used to populate one or more data fields based on the identity of the user who printed the document. The shareable document characteristics are then published on the profile pages of the user who printed the document, as described above in relation to FIG. 1. In one embodiment, the title of the document being printed is published on the profile pages of all the member of a user's user network, while in another embodiment, the title is published on the pages of all the members within the organization. Accordingly, the portal enables a user to automatically publish sharing information through a printer user interface. As would be appreciated, if the user unchecks the "Publish" checkbox 202, the user is not prompted for further shareable document characteristic information and such information is not communicated to, or published within, the portal.

Figure 3:
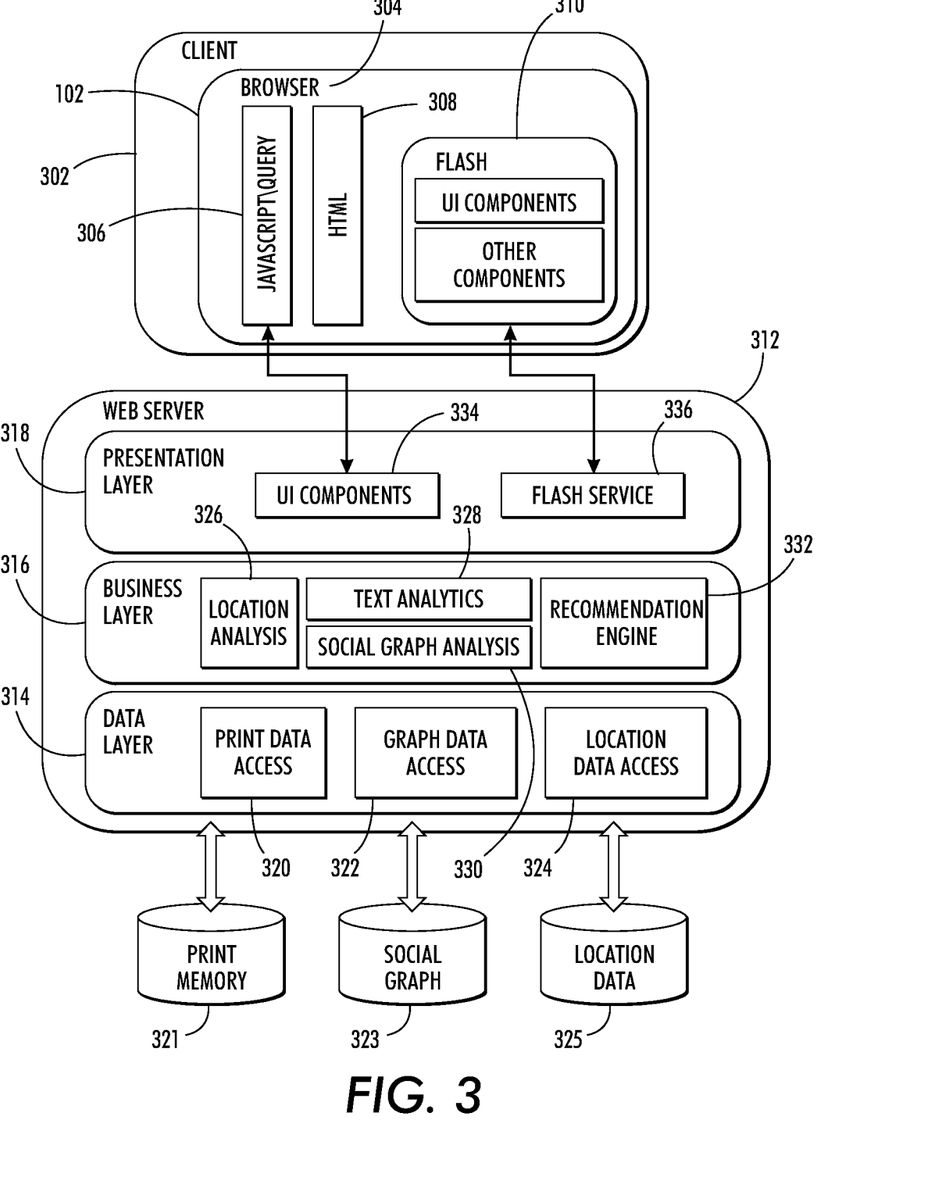
FIG. 3 illustrates a block diagram depicting an exemplary architecture of the network enabling the document sharing portal.

FIG. 3 illustrates a block diagram depicting architecture of an exemplary network enabling the portal. In one embodiment, the architecture is implemented as a client-server model. The client module 302 comprises a graphical user interface (GUI) component that runs in a browser 304 of a client machine, i.e. any computing device. In one embodiment, the GUI component running in the browser 304 is implemented by using a Javascript module 306, a HTML module 308 and an Adobe Flash module 310.

The server module 312 is implemented in a layered model and comprises a data layer 314, a business layer 316 and a presentation layer 318. The data layer 314 is the lowest layer and is responsible for accessing data from a plurality of enterprise databases. In one embodiment, the data layer 314 comprises a print data access module 320, a graph data access module 322, and a location data access module 324 which access a print memory database 321, a social graph database 323 and a location data database 326, respectively.

The print data access module 320 is in data communication with the print logs of printers installed in an organization implementing the portal. In one embodiment, a print memory component is employed in the print memory database 321. The print memory component captures information with respect to the stream of documents printed in different printers installed in the organization. Information captured includes document name, user, timestamp, print location, among other variables. Additionally, document fingerprints are also stored in the print memory component for efficient and effective retrieval of similar documents from print history.

In various embodiments, the print data access module 320 communicates with the printer interfaces of one or more printers installed in the organization to receive real-time information regarding printing activity. This communication enables the automatic notification feature of the present invention, which is used to notify a user if another user has, within a predefined time period, printed the same shareable document that is required by, or is about to be printed by, the user. In an embodiment, when a user executes a print command, i.e. clicks "OK" to print, a software module determines if the same document had already been printed earlier within a predefined time period. This information regarding print history is obtained from the print memory database 321, through the print data access module 320.

If a match is found, then a display pops up which shows the matching document entry along with details such as, location of the user, the date and time when the document was printed, etc. If more than one match is found, then the resulting entries are sorted based on predefined criteria such as, in descending order of age of the document, i.e. when the shareable document was printed, or physical location, i.e. physical location of the shareable document or whether the two users are part of the same network. In a case where an exact match is not found then a text analytics module 328 of the business layer 316 is used to determine a closest matching document. The text analytics module 328 is described in subsequent paragraphs.

If a user does not uncheck the checkbox 202 before giving a print command, a new entry is created in the print memory database 321 corresponding to the document being printed, if the document has not been printed earlier, or else the user is reprinting the document in spite of the document existing already in the print memory database 321. In an embodiment, the information stored in print memory database 321 with respect to each document, such as document name, user id, timestamp, location etc., can be automatically extracted from local information available on a user's computer.

In various embodiments, print memory enables the system to provide a search mechanism that can exploit the memory of a print action. In one embodiment, it is a temporal flat memory of the documents that a person prints. This storage is additional with respect to the original one, e.g. on the desktop, and provides an additional parameter to be exploited in the context of executing a search: the memory of having printed a document. In such a way the document could be forgotten with respect to its title or categorization and still quickly accessible by issuing searches like "find me the documents I printed last week". Additionally the printer characteristics, such as location or name, are tracked, stored, and are made available for searching. Document fingerprints are also stored in print memory for efficient and effective retrieval of similar documents from print history. The print memory technique is known in the art and will not be further described herein.

The graph data access module 322 connects to the social graph database 323 which depicts the users and their mutual relationship in the form of a social graph, which is well known in the art. Each user is represented as a node in the social graph and there is an undirected link between two users if each of the two users belongs to a network of the other. Hence, all members of the organization using the portal, as well as the inter-relationship among them is represented by using the social graph database 323 accessible via the graph data access module 322.

The location data access module 324 connects to a location data database 325 which stores location information corresponding to every user. In various embodiments, the location information comprises an office number, a cubicle number, a home address, and/or one or more IP addresses of the printers installed in a predefined network. The location information is used to make suggestions to one or more users regarding identification of a closest printed document available, or appearance of a new user who may be included in the user's network based on predefined criteria such as location proximity, reading preference, etc.

The business layer 316 is used to implement business logics, run analytics on document content and print history, as well as perform social graph analyses. The business layer 316 comprises a location analysis module 326, a text analytics module 328, a social graph analysis module 330, and a recommendation engine 332.

The location analysis module 326 interfaces with the location data access module 324 and is used for making recommendations to a user regarding identification of a closest printed document available, or appearance of a new neighbor, among other determinations. In one embodiment, the location of a printed document is made available to a user by using data obtained from the print memory module and location data obtained from a floor plan of the office area in which the present invention is employed.

The text analytics module 328 is used for handling document content. In an embodiment, the text analytics module 328 is designed to implement several known document handling techniques and algorithms such document clustering, nearest neighbor algorithms, and near-duplicate identification, in order to identify relevant documents and make recommendations based on those analyses. In one embodiment, similarity measures existing in prior art, such as cosine similarity, Jaccard similarity, among other approaches, may be used by the text analytics module 328. In another embodiment known measures like fraction of word overlap may also be employed. In various embodiments, the text analytics module 328 enables computation of different document characteristics such as document fingerprints, forward and backward index (TF-IDF) of document contents, among other characteristics. In an embodiment, when a user executes a print command, i.e. clicks "OK" to print, a software module determines if the same document had already been printed earlier within a predefined time period. In a case where an exact match is not found the text analytics module 328 is used to determine a closest matching document.

The social graph analysis module 330 obtains input from the social graph database via the graph data access module 322 and identifies one or more activities taking place in the network of each user. In an embodiment, the social graph analysis module 330 also identifies new social connections of a user and updates the social graph database by adding new nodes and links. In an embodiment, standard algorithms known in the art are used for identifying new social activities and updating the social graph database. The recommendation engine 330 is designed to form a layer on top of the other modules of the business layer 316 in order to make final recommendation for a user and may use any recommendation system known in the art, including collaborative filtering.

The topmost layer of the server module 312 is the presentation layer 318, which interacts with the underlying business layer 316 as well as the client side module 320. The presentation layer 318 comprises a user interface module 334 and a flash services module 336 for interacting with the Javascript module 306 and the flash module 310 of the client side module 320, respectively. In an embodiment, the presentation layer 318 is designed in a standard format known in the art for pushing different output from the business layer 316 for continuous display or update on the client side module 302. In various embodiments, the presentation layer 318 of the present invention implements standard functionality commonly known in the art for pushing different output from the business layer to the client side module.

Hence, the present application discloses a way to share paper documents leading to reduced paper consumption and increased intra-organization collaboration. The present system can be easily connected with other collaborative platforms, both intra-organization as well as public. The portal can be extended to sharing of any paper based materials like journals, magazines, or books. It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A method for enabling a physical sharing of a hard copy of a document, said method being performed by a computing device having a processor and a memory storing a plurality of programmatic instructions, wherein, when said processor executes said plurality of programmatic instructions, said computing device:

presents a first graphical user interface to a user, wherein said first graphical user interface comprises a plurality of printing options for printing the document, wherein said first graphical user interface comprises an input for receiving an indication by the user that the user is willing to physically share the hard copy of the document within a predefined period of time;

presents to said user a plurality of options in response to receiving said indication, wherein selection of said options defines a plurality of characteristics of said hard copy of the document and wherein said plurality of characteristics include at least one of title, date, location of document, or location of printing; and transmits at least one of said characteristics of said hard copy to a server, wherein said server hosts at least a portion of a social network comprising a profile page of the user, wherein at least one of said characteristics of said hard copy is published on said profile page, and wherein said profile page is accessible to everyone who is connected to the user in a social network.

2. The method of claim 1 wherein said plurality of options is presented in at least one of said first graphical user interface, a pop up window, a dialog box, or a second graphical user interface.

3. The method of claim 1 wherein said server prompts the user to define at least one requirement for a hard copy of a document, wherein said requirement is subsequently published on the profile page of the user and published on a profile page of at least one other user belonging to the social network.

4. The method as claimed in claim 1 wherein said computing device presents to the user a notification notifying the user if another user has, within a predefined time period, printed the hard copy of the document.

5. The method of claim 4 wherein said notification is generated automatically by comparing an attribute of the hard copy of the document to data indicative of documents which have been previously printed.

6. The method of claim 5 wherein said attribute is at least one of said plurality of characteristics.

7. The method of claim 4 wherein said notification is generated automatically by accessing a print history of one or more printers installed in a predefined network and finding a match based on document characteristics.

8. The method of claim 7 wherein, if a match is found, document information comprising a location of the user who had printed the document and a time when the document was printed is displayed.

9. The method of claim 8 wherein, if a match is not found, a closest match to the document is found based on predefined criteria.

10. The method of claim 1 wherein the profile page of the user provides recommendations to the user to connect to one or more users based on predefined criteria.

11. A computing system for enabling a physical sharing of a hard copy of a document, comprising:
a plurality of programmatic instructions stored on a medium, wherein, when said plurality of programmatic instructions are executed, cause a client computing device to present a first graphical user interface to a user, wherein said first graphical user interface comprises a plurality of printing options for printing the document, wherein said first graphical user interface comprises an input for receiving an indication by the user that the user is willing to physically share the hard copy of the document within a predefined period of time; and a computing device for hosting at least a portion of a social network comprising a profile page of the user, wherein said computing device receives at least one of characteristic of the hard copy of the document, in response to the user indicating a willingness to physically share the hard copy and publishes said characteristic on the profile page of the user, wherein said profile page is accessible to everyone who is connected to the user in a social network, and wherein said characteristic include at least one of title, date, location of document, or location of printing.

12. The system of claim 11 wherein said plurality of programmatic instructions further cause the client computing device to present to said user a plurality of options in response to receiving said indication, wherein selection of said options defines a plurality of characteristics of said hard copy of the document.

13. The computing system of claim 11 wherein said plurality of options is presented in at least one of said first graphical user interface, a pop up window, a dialog box, or a second graphical user interface.

14. The computing system of claim 11 wherein said computing device prompts the user to define at least one requirement for a hard copy of a document, wherein said requirement is subsequently published on the profile page of the user and published on a profile page of at least one other user belonging to the social network.

15. The computing system of claim 11 wherein said plurality of programmatic instructions further cause the client computing device to present to the user a notification notifying the user if another user has, within a predefined time period, printed the hard copy of the document.

16. The computing system of claim 15 wherein said notification is generated automatically by comparing an attribute of the hard copy of the document to data indicative of documents which have been previously printed.

17. The computing system of claim 15 wherein said notification is generated automatically by accessing a print history of one or more printers installed in a predefined network and finding a match based on document characteristics.

18. The computing system of claim 17 wherein, if a match is found, document information comprising a location of the user who had printed the document and a time when the document was printed is displayed.

19. The computing system of claim 17 wherein, if a match is not found, a closest match to the document is found based on predefined criteria.

\* \* \* \* \*